No. 636,028. Patented Oct. 31, 1899.
A. H. ENGSTROM.
ELECTRIC SYSTEM FOR AUTOMATICALLY GOVERNING POLYPHASE CIRCUIT BREAKERS.
(Application filed Jan. 28, 1899.)
(No Model.)
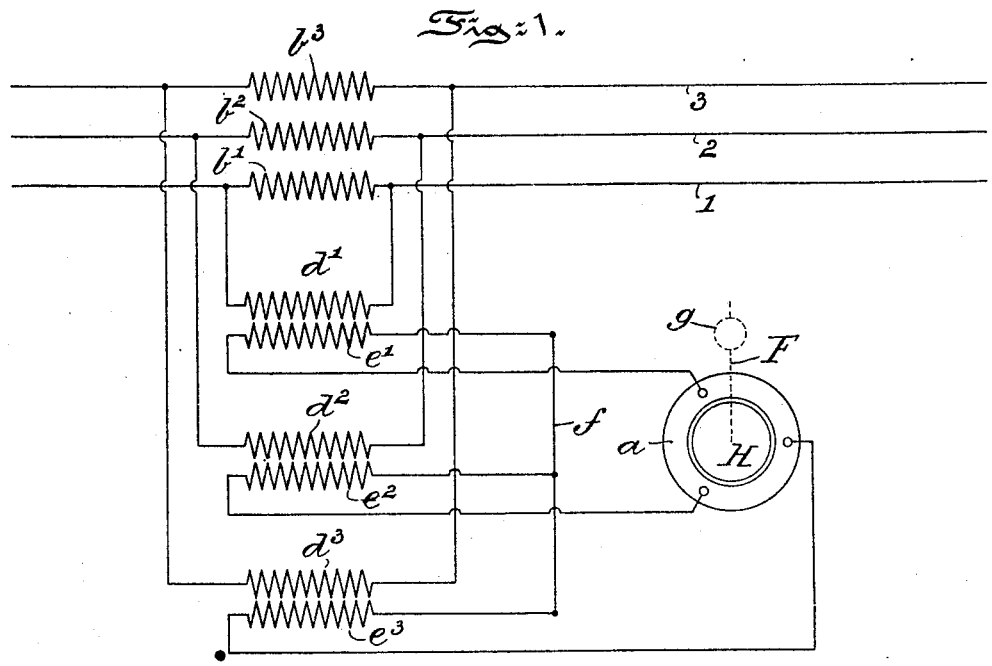
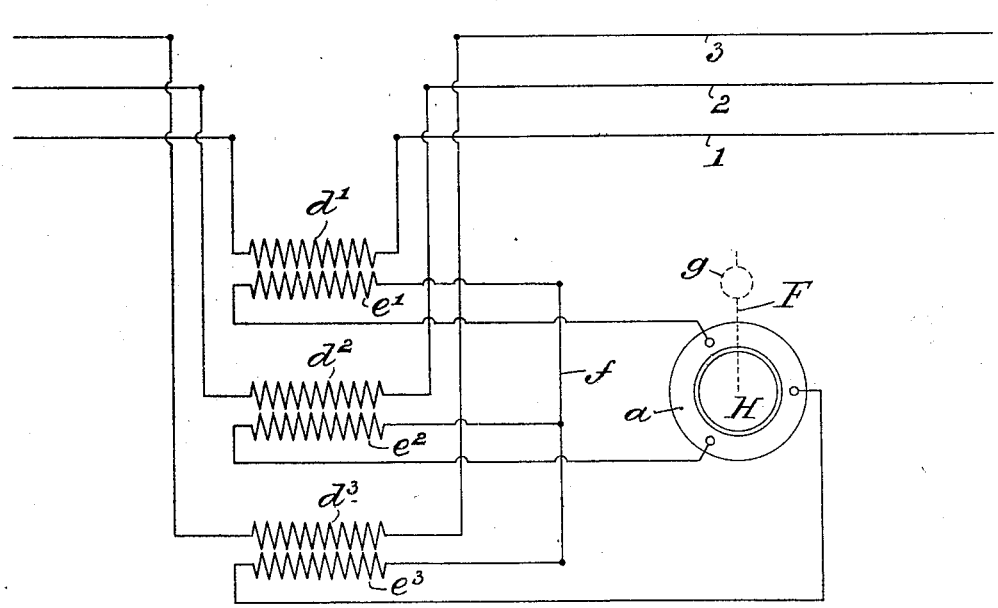
Witnesses:
Richard C. Maxwell
Thomas M. Smith
Inventor:
Axel H. Engstrom,
By J. Walter Douglass
Attorney

UNITED STATES PATENT OFFICE.

AXEL H. ENGSTROM, OF PHILADELPHIA, PENNSYLVANIA.

ELECTRIC SYSTEM FOR AUTOMATICALLY GOVERNING POLYPHASE-CIRCUIT BREAKERS.

SPECIFICATION forming part of Letters Patent No. 636,028, dated October 31, 1899.

Application filed January 28, 1899. Serial No. 703,693. (No model.)

*To all whom it may concern:*

Be it known that I, AXEL H. ENGSTROM, a citizen of the United States, residing at the city of Philadelphia, in the county of Philadelphia and State of Pennsylvania, have invented certain new and useful Improvements in Electric Systems for Automatically Governing Polyphase-Circuit Breakers, of which the following is a specification.

My invention has relation to a system for automatically governing polyphase-circuit breakers, and in such connection it relates to the arrangement and combination of parts comprising such a system.

My invention consists in providing, in conjunction with a polyphase motor having a field-ring and an armature controlling the circuit-breaker, a polyphase electric line or circuit, and series transformers interposed in said circuit and adapted to set up a rotary magnetic field in the field-ring, said armature being under the continuous but varying torque exerted by the field and a constant opposing torque exerted by a counterweight or its equivalent.

The nature and scope of my invention will be more fully understood from the following description, taken in connection with the accompanying drawings, forming part hereof, in which—

Figure 1 is a diagrammatic view illustrating the preferred manner of arranging the various parts entering into the system of my invention, and Fig. 2 is a similar view of a modification thereof.

Referring to the drawings, $a$ represents a polyphase motor having a field-ring and an armature, counterweighted or under a constant torque, controlling a circuit-breaker (not shown) of any suitable type or form.

In a companion application, filed January 31, 1899, Serial No. 703,981, a preferred form of motor and accessories for operating a circuit-breaker are illustrated and described, and in a second companion application, filed February 3, 1899, Serial No. 704,439, I have illustrated a preferred form of circuit-breaker for use in the present system.

In Fig. 1, which is the preferred construction, in each main circuit 1, 2, or 3 is interposed a resistance $b'$, $b^2$, and $b^3$, and in shunts from each main circuit are arranged in series primary coils $d'$, $d^2$, and $d^3$ of series transformers. The secondary coils $e'$, $e^2$, and $e^3$ of these series transformers have one terminal of each terminating in a common junction $f$, whereas the other terminal of each connects with the field-windings of the polyphase motor $a$.

In Fig. 2 the arrangement is identically the same as above described, with the exception that the primary coils $d'$, $d^2$, and $d^3$ are included directly in the main circuits 1, 2, and 3, since in the main circuits no resistances are interposed.

The motor $a$ consists of a field ring and armature wound in a manner already known to the art, the armature H being mounted on a shaft provided with a lever F, on which is fastened a counterbalance-weight $g$ or its equivalent, maintaining the armature under a constant torque or tendency to turn in one direction.

The operation of this system is as follows: When an electric current is flowing through the main circuits 1, 2, and 3 and the primary coils $d'$, $d^2$, and $d^3$, a secondary current is set up in the secondary coils $e'$, $e^2$, and $e^3$ of a density proportional to the current in the primaries and will therefore set up in the field-ring a rotary magnetic field, which will exert a torque on the armature H in the motor $a$, increasing with the current in the main circuit until it equals and exceeds the opposing torque caused by the counterbalance-weight $g$. The armature will then be caused to rotate, and thereby actuate mechanism (not shown) adapted to cause the main circuit to be broken.

In the diagrammatic views I have illustrated my invention as applied to a three-phase circuit; but it will be understood that the invention may also be applied to circuits having any number of phases suitable for practical use.

It is obvious that modifications and variations of the system as shown may be made without departing from the spirit and scope of my invention, and I do not therefore desire to limit my invention to what is specifically shown and described.

Having thus described the nature and object of my invention, what I claim as new, and desire to secure by Letters Patent, is—

1. In a system for automatically governing polyphase-circuit breakers, a polyphase circuit, transformers in series with the polyphase circuit, a motor having a field-ring connected with the transformers and an armature under a constant torque and adapted to control the circuit-breaker, said transformers adapted to set up a rotary magnetic field in the field-ring which exerts upon the armature a continuous but varying torque in opposition to the constant torque, substantially as and for the purposes described.

2. In a system for automatically governing polyphase-circuit breakers, a motor having a rotary magnetic field, and a counterweighted armature, said armature being under the influence of two opposing torques, the constant torque of its counterweight and the continuous but varying torque of its field, substantially as and for the purposes described.

In testimony whereof I have hereunto set my signature in the presence of two subscribing witnesses.

AXEL H. ENGSTROM.

Witnesses:
J. WALTER DOUGLASS,
THOMAS M. SMITH.